Oct. 19, 1937. W. L. PEARCE 2,096,132
DRILL
Filed Dec. 16, 1935 2 Sheets-Sheet 1

Inventor
William L. Pearce
By Hardway Mather
Attorneys

Oct. 19, 1937.                    W. L. PEARCE                    2,096,132
                                     DRILL
                              Filed Dec. 16, 1935              2 Sheets-Sheet 2

Inventor
William L. Pearce
By Hardway Cathey
Attorneys

Patented Oct. 19, 1937

2,096,132

UNITED STATES PATENT OFFICE 2,096,132

DRILL

William L. Pearce, Houston, Tex.

Application December 16, 1935, Serial No. 54,699

10 Claims. (Cl. 255—61)

This invention relates to a drill and has particular relation to a drill of the general fish-tail type.

An object of the invention is to provide a drill having a novel type of cutter on the lower end of the body and which is readily replaceable when worn out so that the body of the drill may be reused from time to time.

Another object of the invention is to provide a drill having a cutter thereon formed with oppositely directed blades which have longitudinal fins spaced apart on the forward faces thereof and which are provided with sharp cutting edges to effectively separate and break up the formation moving upwardly along the forward faces of the blade as drilling progresses; said fins also form channels for the drilling fluid which are effective to concentrate the drilling fluid against the formation on the forward faces of the blades whereby said formation is swept off and the blades kept clean.

A further object is to provide a drill of the character described having an enlarged chamber at the lower end of the body for receiving the drilling fluid with outlet openings leading therefrom onto the forward faces of the blades, said chamber being provided with a deflector which will readily deflect the on-coming drilling fluid for a purpose to be hereinafter stated.

With the above and other objects in view the invention has particular relation to certain novel features of construction, arrangement of parts and use, an example of which is given in this specification and illustrated in the accompanying drawings, wherein.

Figures 1, 2:
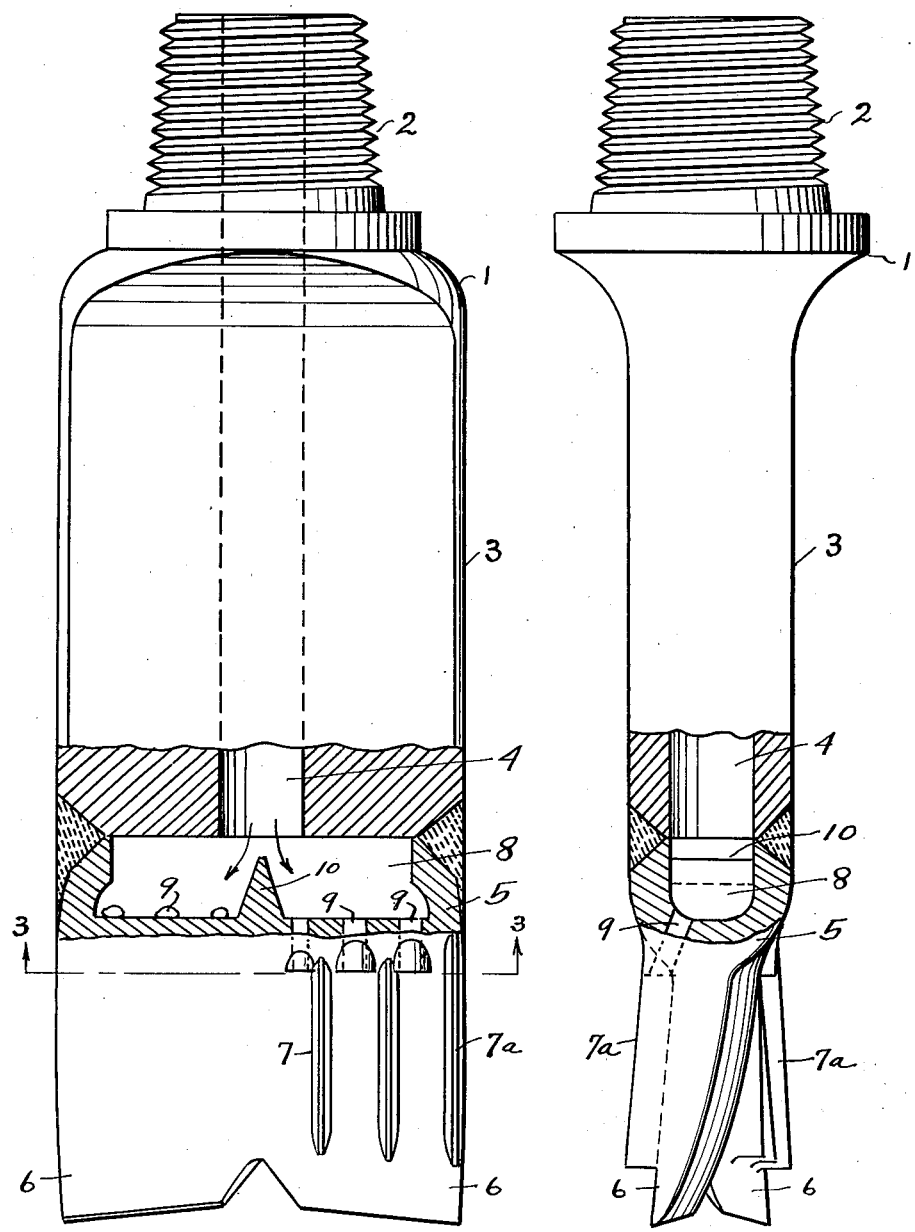
Figure 1 shows a side view of the drill, partly in section.
Figure 2 shows an edge view, partly in section.
Figure 3:
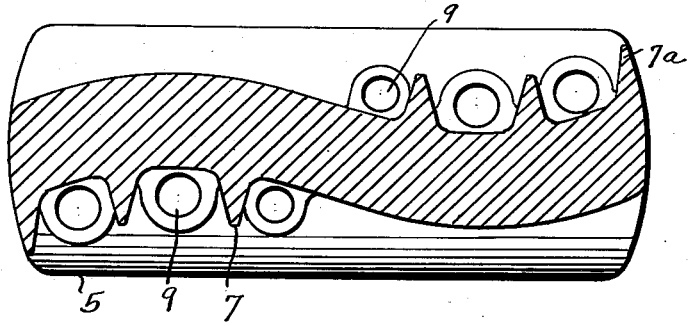
Figure 3 shows a cross-sectional view taken on the line 3—3 of Figure 1.
Figure 4:
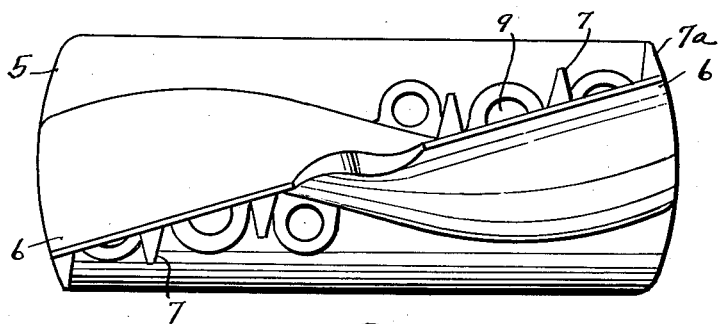
Figure 4 shows a bottom end view of the drill.
Figure 5:
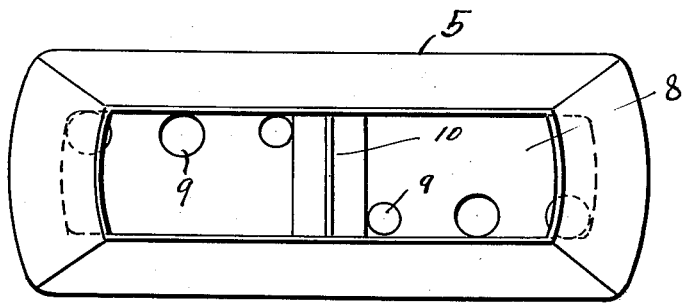
Figure 5 shows an upper end view of the cutter shown detached.

Referring now more particularly to the drawings wherein like numerals of reference designate similar parts in each of the figures, the numeral 1 designates the head of the drill which has the threaded shank 2 for the connection of the drill to the driving stem. Depending from the drill head there is the widened drill body 3 which is approximately rectangular in cross-sectional contour, said head, shank, and body being previously formed integrally together. There is an axial channel 4 leading downwardly through the shank, head, and body, for conducting the drilling fluid.

The numeral 5 designates the cutter whose lower end is preferably formed with oppositely directed cutting blades 6, 6. The cutter 5 is preferably welded to the lower end of the body and when the cutter is worn out, the worn cutter may be detached in any approved manner as by a cutting torch and a new cutter welded to the lower end of the body so that the head, shank, and body may be reused from time to time.

The forward face of each blade has the longitudinal fins, as 7, 7a, suitably spaced apart to provide longitudinal channels between them.

The upper end of the cutter 5 is formed with a transverse cavity 8 forming an enclosed chamber when the cutter is welded to the body, into which the drilling fluid is discharged into the channel 4.

Discharge ports 9 lead downwardly from the chamber and are provided to discharge the drilling fluid onto the forward faces of the blades between the fins, one of said ports also discharging the fluid downwardly along the inner side of the inner fin 7.

There is a transverse deflector 10 across the chamber 8 and aligned underneath the discharge end of the channel 4, said deflector tapering upwardly to a transverse apex.

In drilling through sticky formation such as "gumbo", the formation will pass upwardly along the forward faces of the blades and has a tendency to adhere to the blades. This formation will be divided or broken up by the fins 7, 7a and partially separated from the faces of the blades and the drilling fluid being forced under strong pressure down along the said channels and over the forward faces of the blades will pass underneath the formation adhering to the blades and wash it off of said faces to keep the blades relatively clean and free of the formation, thus conducing to a more rapid progress of the drill through the formation at the bottom of the bore.

The drawings and description disclose what is now considered to be a preferred form of the invention by way of illustration only while the broad principle of the invention will be defined by the appended claims.

What I claim is:

1. A drill comprising a drill body having an axial channel therethrough, a cutter secured to the lower end of the body having a chamber therein and formed with oppositely directed blades, longitudinal fins spaced apart on the forward faces of the blades, said chamber having outlet ports leading into the channels between the fins.

2. A drill comprising a drill body having an axial channel therethrough, a cutter secured to the lower end of the body having a chamber therein and formed with oppositely directed cutting blades, longitudinal fins spaced apart on the forward faces of the blades, said chamber having outlet ports leading into the channels between the fins, and a deflector across the chamber underneath said axial channel.

3. A drill comprising a head having a threaded shank and a flat body depending from the head, a cutter secured to the lower end of the head formed with an internal chamber, said drill having an axial channel leading from the upper end thereof and terminating in the chamber, the cutter being formed with cutting blades, longitudinal fins on the forward faces of the blades spaced apart to provide channels between them, said cutter having outlet ports leading from the chamber through which the drilling fluid may be discharged over the forward faces of the blades and through said blade channels.

4. A drill comprising a head having a threaded shank and a flat body depending from the head, a cutter secured to the lower end of the head formed with an internal chamber, said drill having an axial channel leading from the upper end thereof and terminating in the chamber, the cutter being formed with cutting blades, longitudinal fins on the forward faces of the blades spaced apart to provide channels between them, said cutter having outlet ports leading from the chamber through which the drilling fluid may be discharged over the forward faces of the blades and through said blade channels, a transverse deflector across the chamber underneath said axial channel which tapers upwardly to an apex.

5. A drill having a body and a cutter welded to the lower end of the body, the upper end of the cutter having a transverse chamber therein and the drill having an axial channel leading from its upper end and terminating in said chamber, longitudinal outstanding fins on the forward faces of the cutters, and spaced apart to provide channels between them, said chamber having outlet ports through which the drilling fluid is directed into the upper ends of the channels.

6. A drill having a body and a cutter welded to the lower end of the body, the upper end of the cutter having a transverse chamber therein and the drill having an axial channel leading from its upper end and terminating in said chamber, longitudinal outstanding fins on the forward faces of the cutters, and spaced apart to provide channels between them, said chamber having outlet ports through which the drilling fluid is directed into the upper ends of the channels, and a transverse upwardly tapering deflector across the chamber aligned underneath the lower end of said axial channel.

7. A drill comprising a drill body, a cutter secured to the lower end of the body and formed with oppositely directed blades, longitudinal fins spaced apart on the forward faces of the blades.

8. A drill comprising a drill body, a cutter secured to the lower end of the body and formed with oppositely directed blades, longitudinal fins spaced apart on the forward faces of the blades, said drill having a channel terminating in ports between the fins through which a flushing fluid may be supplied to the blades.

9. A drill having a body, separate cutting means welded to the lower end of the body, said drill having a transverse chamber and having an axial channel leading from its upper end into said chamber, longitudinal outstanding fins on the cutting means and spaced apart to provide channels between them, said chamber having outlet ports through which drilling fluid may be directed into the channels.

10. A drill having a body, separate cutting means welded to the lower end of the body, said drill having a chamber and having an axial channel leading from its upper end into the chamber, outstanding fins on the cutting means spaced apart to provide channels which lead downwardly to the lower end of the drill, said chamber having outlet ports through which drilling fluid may be directed into said channels.

WILLIAM L. PEARCE.